United States Patent

[11] 3,630,131

| [72] | Inventor | Donald M. Harvey |
| | | Webster, N.Y. |
| [21] | Appl. No. | 854,567 |
| [22] | Filed | Sept. 2, 1969 |
| [45] | Patented | Dec. 28, 1971 |
| [73] | Assignee | Eastman Kodak Company |
| | | Rochester, N.Y. |

[54] FLASHBULB INDEXING MECHANISM
9 Claims, 15 Drawing Figs.

[52] U.S. Cl. .................................................. 95/11
[51] Int. Cl. .......................................... G03b 15/035
[50] Field of Search .......................................... 95/11;
240/1.3; 431/92

[56] References Cited
UNITED STATES PATENTS

| 3,383,955 | 5/1968 | Bresson | 95/11.5 |
| 3,463,067 | 8/1969 | Fauth | 95/11 |

*Primary Examiner*—John M. Horan
*Attorneys*—Robert W. Hampton and J. Addison Mathews ABSTRACT: A camera adapted to use a so-called flashcube or other multiple flashbulb unit is provided with an indexing mechanism which operates automatically prior to each film exposure to index the flashbulb unit until the mechanism detects the arrival of an unfired lamp at a predetermined firing position. If no unfired lamp is available, an appropriate signal is provided automatically to alert the camera operator to that fact.

PATENTED DEC 28 1971　　　　　　　　　　3,630,131

DONALD M. HARVEY
INVENTOR.

BY
ATTORNEYS

DONALD M. HARVEY
INVENTOR.

ATTORNEYS

DONALD M. HARVEY
INVENTOR.

ATTORNEYS

DONALD M. HARVEY
INVENTOR.

BY
ATTORNEYS

FLASHBULB INDEXING MECHANISM

CROSS-REFERENCE TO RELATED PATENT APPLICATIONS

Reference is made to the following commonly assigned, copending U.S. Pat. applications:
1. Ser. No. 850,125, filed Aug. 14, 1969, in the name of Edward L. Sturm, entitled FIRING MECHANISM FOR PERCUSSIVELY IGNITABLE FLASHLAMPS;
2. Ser. No. 850,701, filed Aug. 14, 1969, in the names of William H. Horton et al., entitled FLASH FIRING AND SENSING MECHANISM FOR CAMERA OR ATTACHMENT ADAPTED TO USE PERCUSSIVELY FIREABLE FLASHLAMPS;
3. Ser. No. 855,467, filed Sept. 2, 1969, in the names of William H. Horton et al., entitled SOCKET FOR PERCUSSIVELY IGNITABLE MULTIPLE LAMP FLASHBULB UNITS; and
4. Ser. No. 767,145, filed Aug. 14, 1969, in the name of Edward L. Sturm, entitled CONTROL, SIGNAL AND ACTUATING MECHANISM FOR USE WITH PHOTOFLASH LAMP UNITS HAVING PREENERGIZED STRIKERS.

BACKGROUND OF THE INVENTION

1. Field of the Invention

The present invention relates to cameras adapted to use so-called flashcubes or other multiple flashbulb units and more particularly to the provision of such a camera with an indexing mechanism which operates automatically prior to each film exposure to index the flashbulb unit until the mechanism detects the arrival of an unfired lamp at a predetermined firing position.

2. Description of the Prior Art

Many modern cameras are adapted to use so-called flashcubes comprising four flashlamps combined in a single flashbulb unit, which is received by a socket member that can be rotated to move each lamp, in turn, into firing position. In the past, the lamps of such flashcubes have been fired by electrical means, but similar percussively fired flashcubes have recently been developed, as described, for example, in U.S. Pat. application Ser. No. 850,701 filed Aug. 14, 1969 entitled "Flash Firing And Sensing Mechanism For Camera Or Attachment Adapted To Use Percussively Fireable Flashlamps," filed in the names of W. H. Horton and C. W. Michatek, and U.S. Pat. application Ser. No. 767,145, filed Aug. 14, 1969, entitled CONTROL, SIGNAL AND ACTUATING MECHANISM FOR USE WITH PHOTOFLASH LAMP UNITS HAVING PRE-ENERGIZED STRIKERS, filed in the name of Edward L. Sturm.

In order to bring successive lamps of a flashcube into firing position, it is well known to rotationally advance the flashcube socket member of a camera through successive 90° angles in response to successive operations of the camera's film winding mechanism. Since the lamp being advanced to firing position may already have been fired, it is also known to provide a signal system for alerting the photographer to the presence of an inoperative lamp at that position so that he can replace the flashcube or advance it manually to locate an operative lamp at the firing position. In cameras adapted to use electrically ignited flashcubes, such a signal system generally comprises means for testing the condition of a lamp by the use of an electrical current of insufficient strength to effect ignition, as disclosed, for example, in U.S. Pat. No. 3,383,995. Similarly, as disclosed in aforementioned Horton et al. U.S. Pat. application Ser. No. 850,701 filed Aug. 14, 1969, the condition of a lamp in a percussively ignitable flashcube can be determined by mechanically sensing the position of a striker element incorporated in the flashcube.

SUMMARY OF THE INVENTION

In accordance with the present invention, a camera adapted to use a flashcube or other multiple flashbulb unit is likewise provided with warning signal means and with an indexing mechanism which operates in response to each successive advancement of the camera film. However, instead of simply moving the next available lamp into firing position each time the film is advanced, the subject mechanism is adapted to sense the condition of the lamp located at the firing position and to continue the indexing movement of the flash unit until a usable lamp is brought to that position. In other words, each successive film-advancing operation will move a usable lamp into firing position unless all of the available lamps have been previously fired, whereupon the warning signal will appear to alert the photographer to that situation.

Various means for practicing the invention and other advantages and novel features thereof will be apparent from the following detailed description of illustrative preferred embodiments of the invention, reference being made to the accompanying drawings in which like reference numerals denote like elements.

DESCRIPTION OF THE ILLUSTRATIVE PREFERRED EMBODIMENTS

Figure 1:
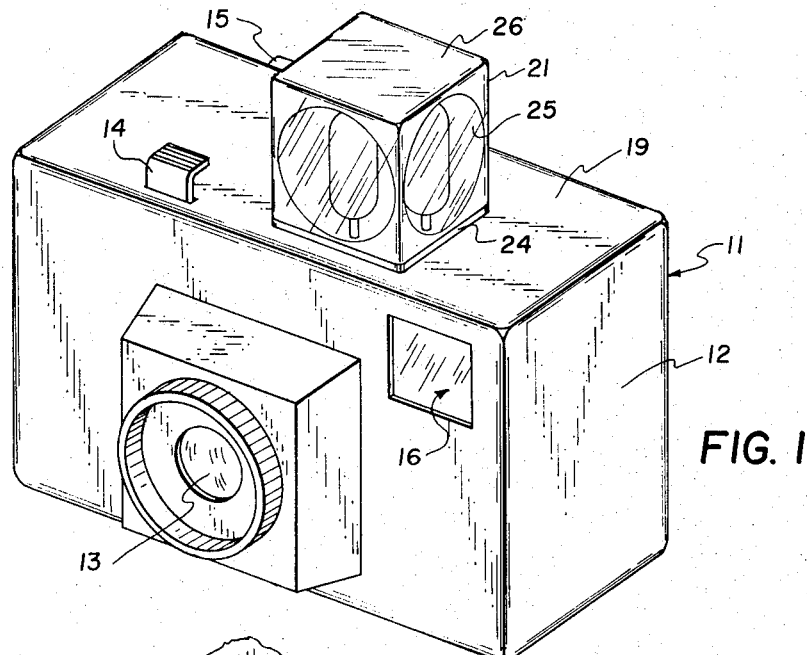
FIG. 1 is a perspective view of a camera of a type adapted to accommodate a flashcube indexing mechanism according to the present invention.
Figure 2:
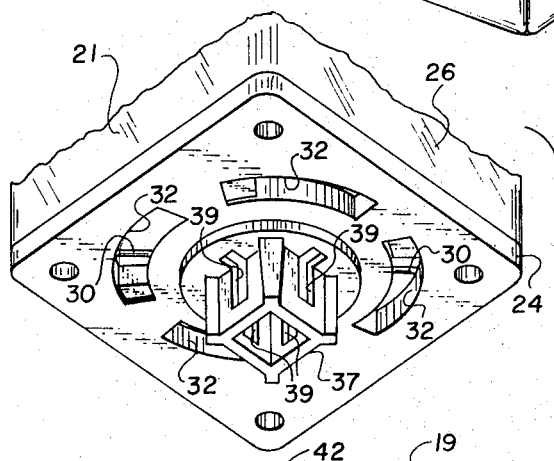
FIG. 2 is a perspective view of the base of a percussively ignitable flashcube and of a camera socket member adapted to receive the same.

The camera shown in FIG. 1, designated by numeral 11, is of generally conventional appearance, comprising a boxlike housing 12, and objective lens assembly 13, a shutter operating member 14, a handle 15 of a film winding lever, and a viewfinder 16. As shown in FIG. 2, a socket member 17 is located within the camera housing and is accessible through a circular opening 18 in the top housing wall 19 to allow a percussively ignitable flashcube 21 to be rotatably supported atop the camera.

Figure 3:
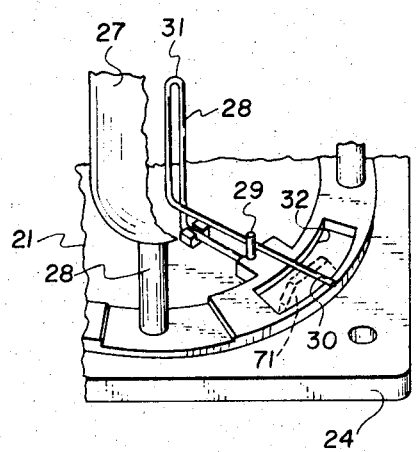
FIG. 3 is a perspective fragmentary view of a percussively ignitable flashcube, partially depicting one of the flashbulbs therein and showing the percussive ignition means associated with that bulb.

As described more specifically in the aforementioned Horton et al. U.S. Pat. application Ser. No. 850,701 filed Aug. 14, 1969, the percussively ignitable flashcube comprises four flashbulbs 22a through 22d, which are supported by their respective ignition tubes 23 on a generally square base member 24. A reflector member 25 provides a concave reflecting surface behind each respective flashbulb, all of which are enclosed in a transparent housing 26 attached to the base member. As best shown in FIG. 3, each of the flashbulbs includes a glass envelope 27, which is partially filled with fine zirconium wire or some other combustible material adapted to provide illumination when ignited. The ignition tube 23 of each flashbulb is hollow and relatively thin and contains a percussion-sensitive primer material coated on a central anvil pin within the bore of the tube. As is also shown in FIG. 3, each of the flashbulbs is associated with a corresponding percussion member comprising a resilient striker wire 28, one end of which is supported to the base member and projects upwardly to provide a stop pin 29. The opposite free end of the striker wire is disposed horizontally as shown at 30, and is biased toward the ignition tube of the corresponding flashbulb by the torsional influence of the upwardly extending central loop 31 of the wire. Initially, the free end of the striker wire is trapped in a cocked position behind stop pin 29 above the corresponding arcuate slot 32 in the flashcube base member. If the free end of the striker wire is lifted beyond its stop pin, however, it will snap into percussive contact with the ignition tube of the corresponding bulb. The impact of the wire against the ignition tube locally pinches the tube against the anvil pin, causing the primer material to be exploded and thrown upwardly into the glass envelope to effect ignition of the combustible material within the bulb envelope.

Figure 5:
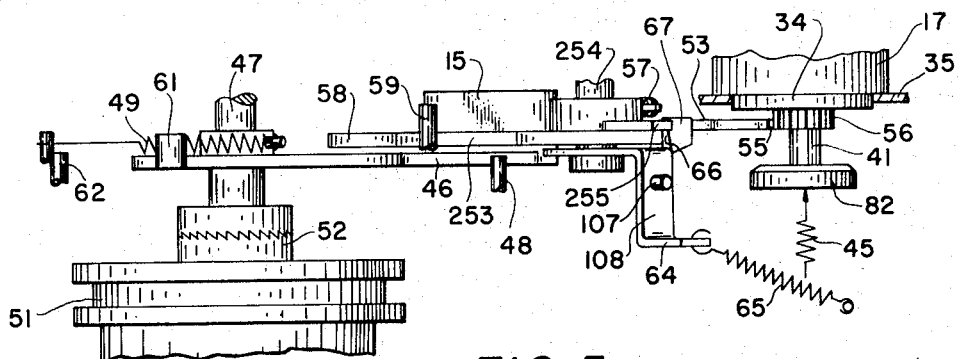
FIG. 5 is a front elevational view of the mechanism depicted in FIG. 4.

The flashcube socket member 17 is of generally cylindrical configuration and is rotatably supported by the reception of its cylindrical upper shoulder 33 in circular opening 18 of the top wall of the camera housing and by the reception of a similar lower shoulder, shown at 34 in FIG. 5, in a corresponding opening in support plate 35. As disclosed in greater detail in the aforementioned Horton et al. U.S. Pat. application Ser. No. 850,701 filed Aug. 14, 1969, the socket member is provided with a central opening 36 adapted to receive the generally rectangular base post 37 of a percussively ignitable flashcube to rotationally align the flashcube with the socket member. When the flashcube is thus installed in the socket, four resilient pawl fingers 38 in the latter engage corresponding openings or slots 39 in the flashcube base post to hold the flashcube in its loaded position. Although the flashcube can be manually withdrawn from the socket in opposition to the resilient pawl fingers, the latter are of sufficient strength to prevent the flashcube from being dislodged by the upward pressure exerted on the ignition wires to fire the flashbulbs.

Figure 8:
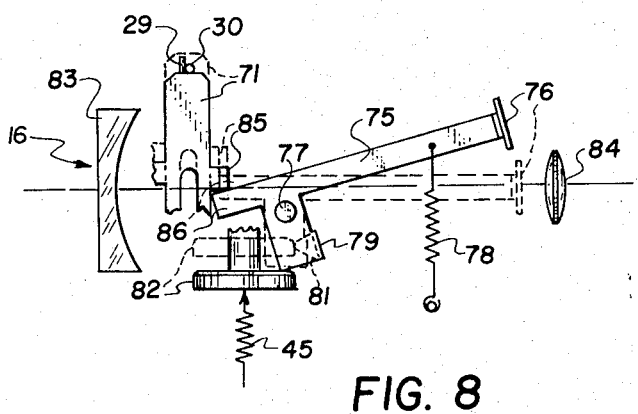
FIG. 8 is an end view of the signal device incorporated in the structure shown in FIG. 6, illustrating the means by which a signal is provided in the camera viewfinder to indicate the presence or absence of a usable bulb in a flashcube mounted on the camera.

For purposes hereinafter described, a sensing pin 41 is received in the tubular central stud 42 of the socket member with its opposed wings 43 extending outwardly through stud slots 44 into socket opening 36. The sensing pin is urged upwardly by a spring shown at 45 in FIG. 8, whereby the pin assumes a raised position when the socket is empty but is depressed by the base post of a flashcube loaded into the socket member.

Figure 4:
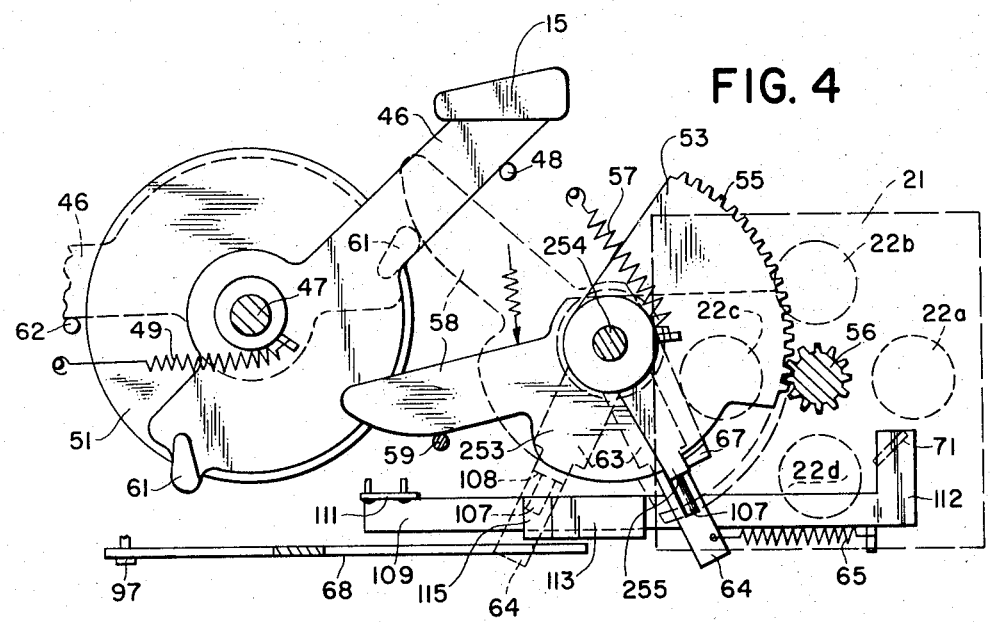
FIG. 4 is a somewhat schematic plan view of the drive mechanism of a camera comprising a preferred embodiment of the present invention.

Referring now to FIGS. 4 and 5 of the accompanying drawings, the subject camera will be seen to include a film winding mechanism comprising a winding lever 46 carried by a rotatably supported vertical shaft 47 and biased in a clockwise direction against a stop pin 48 by a spring 49. The lower end of shaft 47 is connected to the film takeup spool 51 within the camera through a unidirectional clutch depicted at 52, thereby causing film to be wound onto the takeup spool in response to reciprocatory movement of the winding lever. A sector member 53 is rotatably supported by vertical stud 254 and includes gear sector 55 permanently meshed with pinion 56 at the lower end of the socket member. A spring 57 biases the sector member in a counterclockwise direction to the position shown in solid lines in FIG. 4. The sector member 53 is driven against the bias of spring 57 by a cocking member 253 also rotatably supported by vertical stud 254 and having an arm 58 resiliently biased toward a stop pin 59. When the sector member is in the position shown in solid lines in FIG. 4, the flashcube received in the socket member is located in parallel relation to the camera housing. Accordingly, the four flashbulbs initially occupy the respective positions shown in broken lines in FIG. 4, with bulb 22d located at the firing position.

The end of sector arm 58 overlaps the edge of the firing lever in the path of movement of drive stud 61 projecting upwardly therefrom. Therefore, when winding lever 46 is moved manually into contact with abutment pin 62, as shown in broken lines in FIG. 4, drive stud 61 engages arm 58 and rotates the cocking member in a clockwise direction to the position likewise shown in broken lines. The cocking member 253 includes a lug 67 positioned to engage an ear 255 on the sector member 53 when the cocking member is moved in a clockwise direction to move the sector member also in a clockwise direction. Such rotation imparts counterclockwise rotation to socket member pinion 56 and thereby rotates the flashcube through slightly more than 270° so that flashbulb 22a is moved slightly beyond the firing position.

Drive lever 63 is rotatably supported on stud 54 below sector member 53 with its forwardly extending driving arm 64 biased both downwardly and in a counterclockwise direction by a spring 65. The sloped edge 66 of a depending lug 67 on the sector member engages the drive lever and rotates the latter in a clockwise direction in opposition to spring 65 as the sector member is driven in the same direction by the winding lever. As will be described later, the end of arm 64 connected to spring 65 is held upwardly until it reaches the cocked position shown in broken lines in FIG. 4, whereupon it drops out of engagement with lug 67 and is latched in that position by latch bar 68. Consequently, during the return movement of the winding lever to its former position by spring 49, arm 64 remains in its cocked position while spring 57 urges the flashcube in a clockwise direction to move an operable bulb into firing position, as will be explained in greater detail below. Preferably, the camera is provided with a film-metering mechanism which arrests movement of the winding lever each time a film frame is moved into exposure position. Regardless of the manner in which the film winding is controlled, however, each successive winding operation requires at least one complete movement of the winding lever and not more than a subsequent partial movement of that lever through an angle less than that required to move drive stud 61 into engagement with sector arm 58. Thus, each successive film winding operation will cause the flashcube to be rotated only once, in the manner just described.

Figure 6:
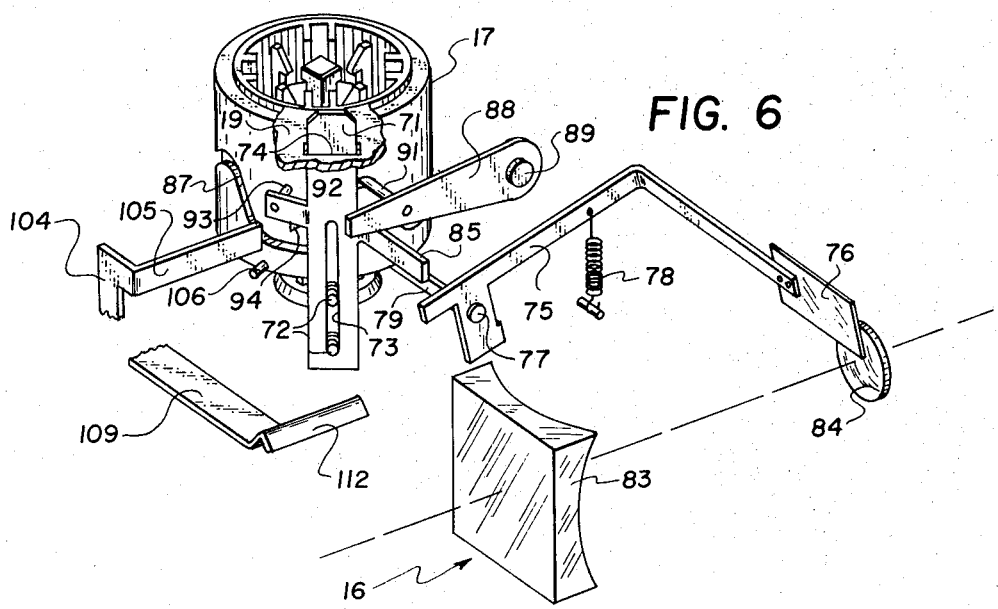
FIG. 6 is a perspective illustration of the flashcube socket shown in FIG. 2, depicting the operative elements associated therewith in accordance with the present invention to sense the condition of the flashcube bulbs and to control the rotation of the socket accordingly.

A firing slide 71 is supported laterally adjacent the socket member by support rivets 72 extending through vertical elongate slot 73, as best depicted in FIG. 6. The upper end of the firing slide extends through a corresponding slot 74 in the upper wall member of the camera and is located directly below the position assumed by the free end of the cocked firing wire associated with the flashcube bulb located in firing position. When the firing slide is in its lowermost position, its upper end is flush with the top surface of the top housing wall 19 and below the lower surface of the base member of a flashcube installed in the socket. If the firing slide is moved upwardly, its upper end enters the corresponding slot in the flashcube base member and engages the cocked firing wire. So long as the upward force exerted to the firing slide is insufficient to raise the firing wire past the corresponding stop pin, the firing slide will therefore assume an intermediate position shown in solid lines in FIGS. 7 and 8, which is indicative of the fact that the corresponding bulb is still operable. When greater upward force is exerted on the firing slide, however, the cocked striker wire engaged thereby will be released from its stop pin as the slide moves to its raised position shown in FIG. 6 and in broken lines in FIG. 7, thereby effecting ignition of the bulb.

A signal lever 75, provided with a translucent signal vane 76, is supported for rocking movement by pivot stud 77 and is biased downwardly by a weak coil spring 78. An arm 79 extends from the signal lever beneath the socket member and is provided with a cam nose 81, shown in FIG. 8. As previously mentioned, when no flashcube is present in the socket member, sensing pin 41 is located in its raised position by spring 45. Consequently, cam disc 82 at the bottom end of the sensing pin is likewise raised to the position shown in broken lines in FIG. 8. Accordingly, disc 82 engages cam nose 81 and holds the signal lever in the position shown in solid lines in FIG. 6 and 8 to maintain the signal vane above the field of view of the viewfinder comprising lenses 83 and 84. When a flashcube is installed in the socket member, its base post depresses the sensing pin so that the cam disc is located as shown in solid lines in FIG. 8, beyond engagement with cam nose 81. Therefore, the position of the signal vane is then established in accordance with the location of the firing slide through the engagement of tongue 85 of the latter with ear 86 of the signal lever, which urges the firing lever upwardly under the influence of spring 78. Since the strength of spring 78 is insufficient to disengage the free end of the striker wire from its stop pin, the presence of a usable bulb at the firing position will allow the firing slide to move upwardly only to its intermediate position shown in solid lines in FIGS. 7 and 8. Accordingly, the signal vane is maintained above the field of view of the viewfinder so that no warning signal is presented to the camera operator. If the bulb at the firing position has already been used, the failure of the firing slide to encounter the corresponding striker wire will allow spring 78 to move that slide to its uppermost position, shown in broken lines in FIGS. 7 and 8; thus allowing the signal vane to move downwardly into view as similarly depicted in FIG. 8.

Figure 7:
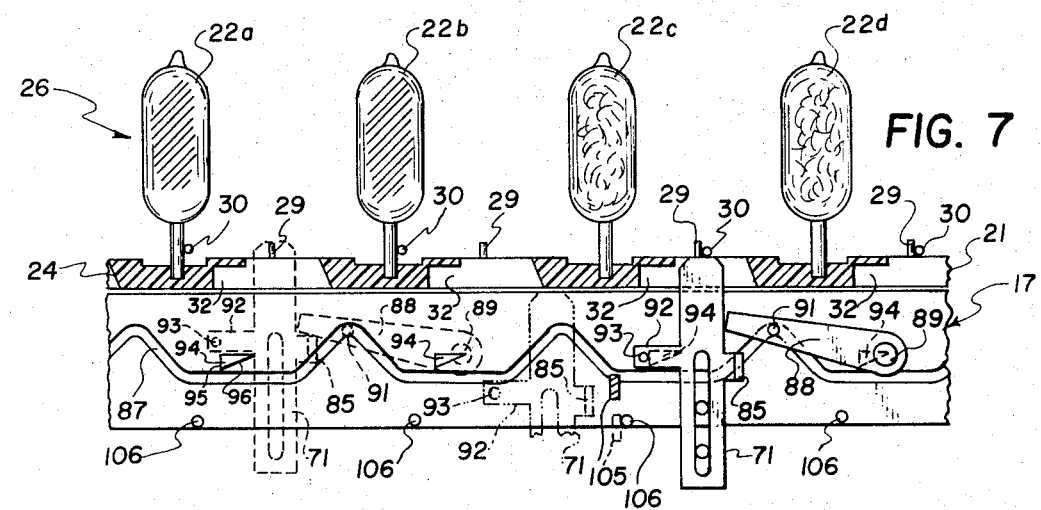
FIG. 7 is a diagrammatic flat development of the structure shown in FIG. 6, illustrating the manner in which the indexing of the socket member is controlled through the agency of cam means associated therewith.

To prevent the firing slide from interfering with rotation of the flashcube, it will be apparent that the slide must be retracted temporarily to its lowermost position shown in dotted lines in FIG. 7 during each indexing movement of the socket member. This function is performed by cam means comprising a continuous cam channel 87 extending about the cylindrical periphery of the socket member. A cam follower lever 88 is pivotally supported by stud 89 and carries a cam follower pin 91 received in the cam channel. Accordingly, as the socket member rotates, the free end of the cam follower lever is raised each time one of the base slots of the flashcube moves into alignment with the firing slide and is lowered as further rotation of the socket member moves the slot beyond alignment with the firing slide. The free end of the cam follower lever is positioned directly above tongue 85 of the firing slide, and is urged upwardly thereby under the influence of the relatively weak spring 78 connected to the signal lever. Therefore, the upper end of the firing slide moves vertically in coordination with the movement of the free end of the cam follower lever so that it enters each successive slot in the flashcube base as the latter is rotated by the socket member. Whenever the firing slide encounters a cocked striker wire, its upward movement is arrested so that it remains in its intermediate position while the cam follower lever completes its upward movement. If no cocked striker wire is encountered, the firing slide moves to its uppermost position, thereby causing the signal vane to appear in the viewfinder.

A similar cam operated arrangement for moving the upper end of a firing slide into and out of the slots in the base of a percussively ignitable flashcube is disclosed in commonly assigned U.S. Pat. application Ser. No. 850,125 Aug. 14, 1969 entitled "Firing Mechanism For Percussively Ignitable flashlamps, filed in the name of E. L. Sturm. In accordance with that disclosure, the flashcube is simply indexed through successive 90° angles by a socket-driving mechanism operated directly by a film winding lever or the like. As will be recalled from the foregoing description of the present invention, however, the rotatively biased socket member 17 is rotated through somewhat more than three-fourths of a revolution in response to each operation of the winding lever and is then released so that it rotates in the opposite direction until a usable bulb arrives at the firing position. Firing slide 71 therefore functions not only to operate the signal means in accordance with the condition of the bulb at the firing position, but also to arrest such reverse rotation of the socket member when the first usable bulb has reached that position.

To accomplish this additional function, the firing slide is provided with a lateral ear 92 which carries a stop pin 93 terminating immediately adjacent the cylindrical peripheral surface of the socket member. As shown at 94 in FIGS. 6 and 7, four uniformly spaced blocking lugs project outwardly from the cylindrical peripheral surface of the socket member with their vertical leading faces 95 facing in the direction of reverse rotation of that member, i.e. to the left as depicted in FIG. 7. During the upward movement of the firing slide engaged with cam follower lever 88, stop pin 93 clears the leading face of the adjacent blocking lug. Whenever the firing slide encounters a cocked striker wire, however, its upward movement is arrested at its intermediate position. Accordingly, the leading face of the adjacent blocking lug encounters stop pin 93, as shown in solid lines in FIG. 7, thereby blocking rotation of the socket member with the corresponding bulb located in position to be fired. In order to prevent the blocking lugs from similarly arresting the initial counterclockwise rotation of the socket member, the lower faces of the lugs are sloped as shown at 96 in FIG. 7 so that they can bypass stop pin 93 by camming the firing slide downwardly in opposition to spring 78.

During rotation of the flashcube, the signal vane will appear momentarily in the viewfinder each time a previously fired bulb moves past the firing position, but will be maintained out of view when the socket member comes to rest with a usable bulb in that position. Therefore, the vane will remain in its visible position only if no usable bulb is available, notwithstanding the sequence of fired and unfired bulbs in the flashcube. Thus, when the flashcube ceases its reverse rotation, the absence of the visible signal indicates that the camera is ready to be operated to produce a flash-illuminated photograph in response to manual depression of shutter-operating member 14.

Figure 9:
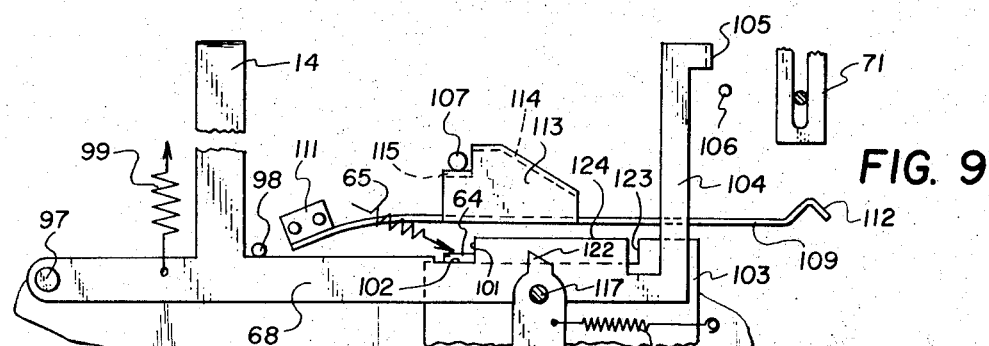
FIGS. 9–12 are somewhat schematic front elevational views of the shutter and ignition actuating means incorporated in the camera shown in the foregoing Figures, illustrating the relative positions of the depicted components during successive stages of operation as the shutter operating member is actuated and as the film is thereafter wound to prepare the camera for the next exposure.

The mechanism employed to operate the camera shutter and to fire the forwardly facing flashcube in synchronism therewith is illustrated in FIGS. 9–12, which schematically depict the functionally similar mechanism shown in greater detail in aforementioned Sturm U.S. Pat. application Ser. No. 850,125 Aug. 14, 1969. The aforementioned latch bar 68 is pivotally supported by stud 97 and is urged upwardly toward stop pin 98 by a relatively strong spring 99. After the film winding and bulb-positioning operation has been completed, the latch bar and the shutter-operating member 14 extending therefrom are located as shown in FIG. 9; with the tip of the cocked drive lever arm 64 trapped by shoulder 101 of the latch bar and resting on horizontal top surface 102 of a stationary guide rail 103. The end of the latch bar opposite stud 97 is provided with an upwardly extending arm 104 which carries a blocking ear 105 positioned laterally adjacent the socket member, as best shown in FIG. 6. When the latch bar is in its raised position, ear 105 is located below the path of movement of blocking lugs 94 but above the lower movement path of four similarly disposed blocking pins 106 projecting radially from the lower edge of the socket member, and therefore cannot interfere with rotation of the latter.

Above the tip of driving arm 64, a horizontal drive pin 107, also shown in FIGS. 4 and 5, is supported by vertical segment 108 of that arm. A resilient striker blade 109 is rigidly supported at one end by mounting ear 111 and is provided at its opposite end with a hammer member 112 located directly below the firing slide engaged with the cocked firing wire of the operatively positioned flashbulb. A cam member 113 is carried by the striker blade and includes a rearwardly facing sloped upper lip 114 and a shorter rearwardly facing lower lip 115. When the camera is in the condition represented in FIG. 9, the lower lip 115 of the cam member is trapped below drive pin 107, thereby maintaining the striker blade in its depicted position with its hammer member below the firing slide. As previously explained, the relatively strong spring 65 urges the tip of driving arm 64 both laterally and also downwardly, thus maintaining that arm temporarily in contact with guide rail 103 in opposition to the weaker upward force exerted on drive pin 107 by the resiliency of the striker blade.

The camera shutter, which is of the well-known impact type, comprises a shutter blade 116 pivotally supported by pivot stud 117 and biased toward pin 118 by a weak spring 119 to maintain the blade normally in alignment with the objective lens aperture shown at 121. A drive lug 122 projects upwardly from the shutter blade beyond the top surface 102 of guide rail 103 and is adapted to be struck by the drive arm, thereby momentarily opening the shutter as explained below.

Figure 10:
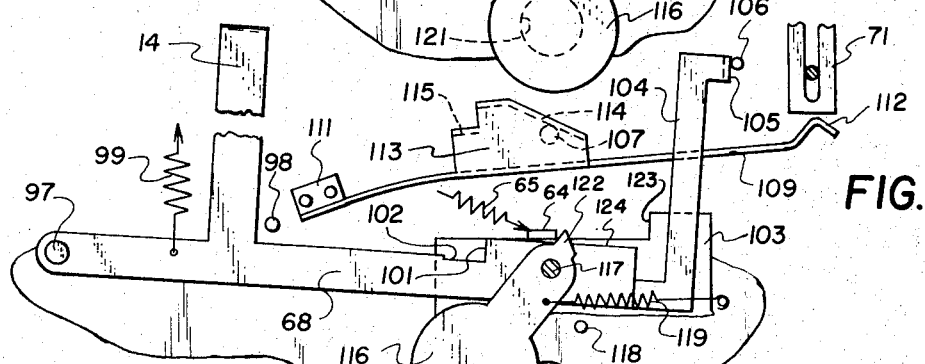
Figure 11:
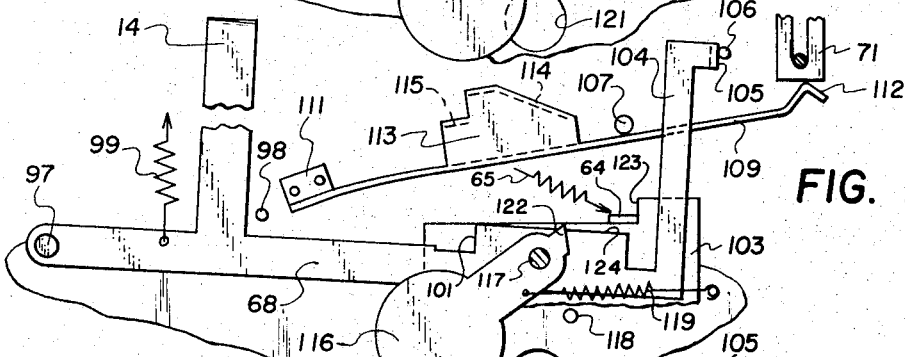

Upon manual depression of the shutter-operating member to the position shown in FIGS. 10 and 11, in opposition to spring 99, shoulder 101 of the latch bar disengages the tip of driving arm 64, causing that arm to be driven rapidly along the top surface of guide rail 103 by spring 65. During such movement of the driving arm, drive pin 107 passes below the sloped upper lip 114 of cam member 113, as shown in FIG. 10 and cams the striker blade upwardly, supplementing the resilient upward force of the striker blade itself. Consequently, the hammer member 112 strikes the lower end of the firing slide and drives that slide upwardly to effect ignition of the operatively positioned flashbulb by dislodging the cocked firing wire. Concurrently, the tip of the driving arm strikes shutter blade drive lug 122 and pivots the shutter blade out of alignment with the objective lens aperture to expose the camera film. Since both the operation of the striker blade and the firing of the bulb are effected in response to the movement of the driving arm, the bulb therefore flashes in predetermined timed relation to the opening of the shutter.

By the time the tip of driving arm 64 abuts against shoulder 123 of guide rail 103, as shown in FIG. 11, it has passed beyond engagement with the shutter blade, which is then returned to its initial position as soon as spring 119 overcomes the inertia of the blade. Also, it will be seen from FIG. 11 that the arrival of the driving arm at the end of its movement path is accompanied by the movement of drive pin 107 beyond the cam member carried by the striker blade, which remains temporarily in its uppermost position.

When the hammer member drives the firing slide upwardly to effect bulb ignition, stop pin 93 moves upwardly past engagement with the corresponding blocking lug 94 on the socket member as depicted in broken lines in FIG. 7. However, the downward movement of the latch bar has now positioned its ear 105 in alignment with the corresponding blocking pin 106 on the socket member, as shown in FIGS. 10 and 11, thereby preventing the flashcube from rotating as the bulb is being fired.

Figure 12:
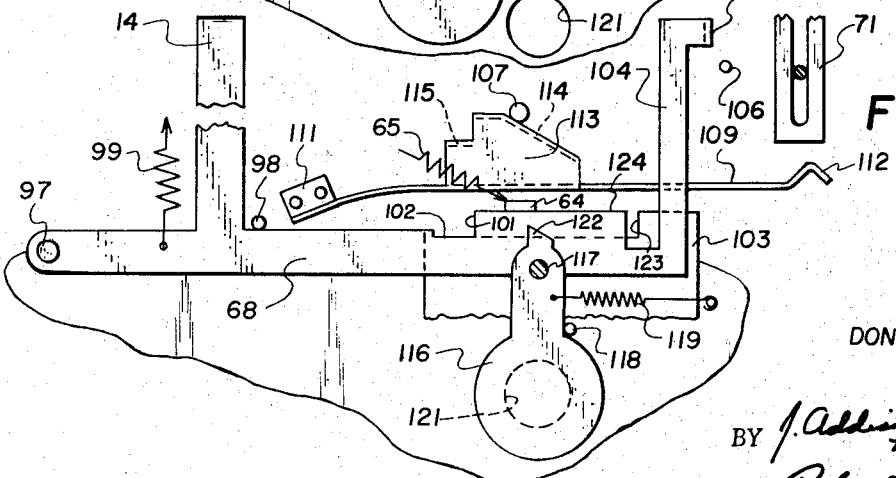

Upon the release of the shutter-operating member, the latch bar is returned to its raised position shown in FIGS. 9 and 12, thus returning ear 105 to its inoperative position and lifting the tip of the driving arm above guide rail 103 to reengage that arm with the gear sector. This upward movement of the tip of the driving arm also raises drive pin 107 to a position in horizontal alignment with the top surface of the sloped cam member. When the winding lever is again operated, the resulting cocking movement of the driving arm therefore causes drive pin 107 to cam the striker blade downwardly as shown in FIG. 12, as the tip of arm 64 rides along the upper edge surface 124 of the latch bar past drive lug 122 of the shutter blade. As it approaches its initial cocked position, the tip of arm 64 drops past shoulder 101 at the end of latch bar surface 124, thus disengaging the driving arm from the sector lever and restoring the various components to their inoperative positions shown in FIG. 9.

Figure 13:
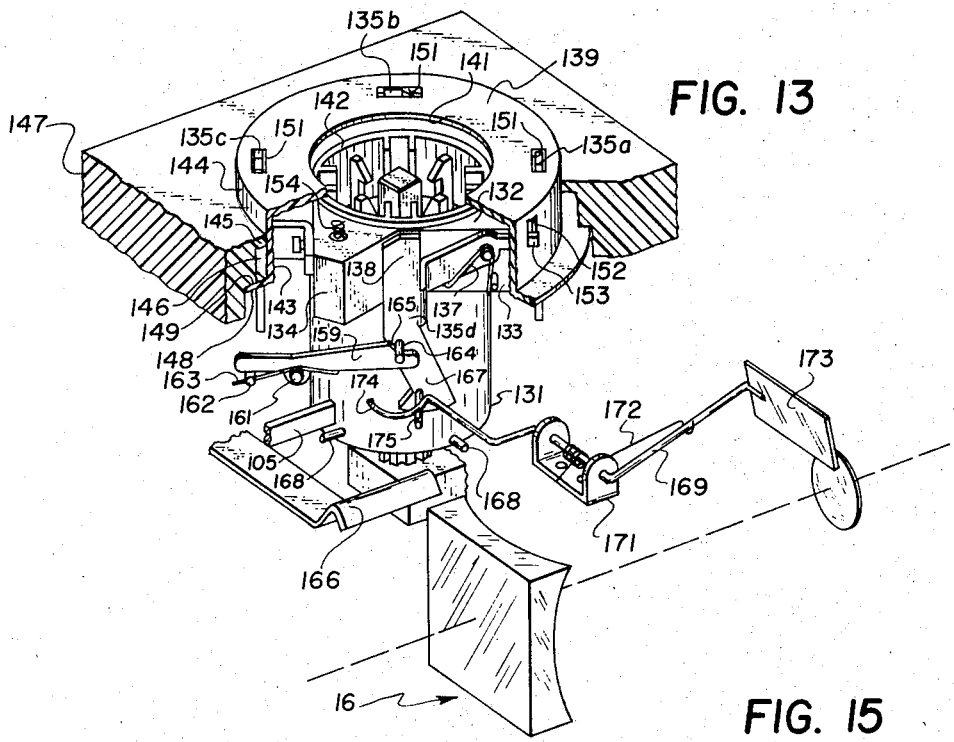
FIG. 13 is a perspective view illustrating a flashcube socket and its associated operative components comprising an alternate embodiment of the invention.
Figure 14:
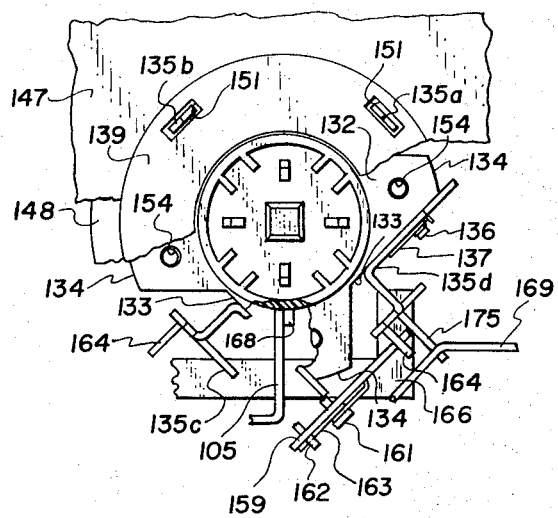
FIG. 14 is a plan view of the structure shown in FIG. 13, partially broken away to illustrate internal details.
Figure 15:
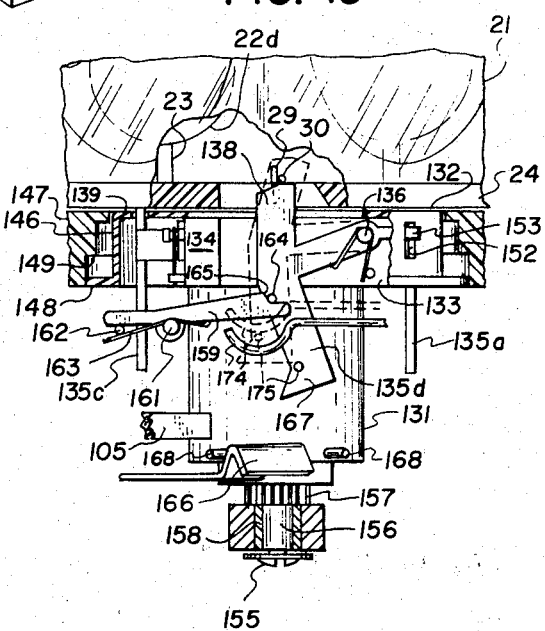
FIG. 15 is a partially cross-sectioned elevational view of the structure shown in FIGS. 13 and 14.

To eliminate the mechanism required to move a single firing member into and out of operative position as a flashcube is rotatively indexed, commonly assigned and concurrently filed U.S. Pat. application Ser. No. 855,467, entitled SOCKET FOR PERCUSSIVELY IGNITABLE MULTIPLE LAMP FLASHBULB UNITS filed in the names of W. H. Horton and E. L. Sturm, discloses a flashcube socket member provided with four separate firing members which move with the socket member as it is rotated through successive 90° angles. The alternate embodiment of the present invention shown in FIGS. 13–15 of the accompanying drawings likewise employs a socket member provided with four separate firing members, but, in addition, is adapted to insure automatically that a usable bulb will always be located at the firing position if such a bulb is available in the flashcube.

The socket member 131 of this embodiment of the invention is generally similar to the previously described socket member 17 but includes an upper collar portion 132 provided with four vertical faces 133 disposed at right angles to each other between peripheral cap support surfaces 135. Firing levers 135a through 135d are pivotally supported against faces 133 by pivot studs 136 and are biased by hairpin springs 137 to urge their vertical tongues 138 upwardly. The four firing levers are designated by the same suffixes previously used to identify different flashbulb positions. In other words, firing lever 135d fires flashbulb 22d, which is located initially at the firing position before the film is advanced and which again comes to rest at that position if only that bulb remains unfired or if all of the available bulbs have been fired.

A vertically movable cap member 139 surrounds the collar portion of the socket member and is provided with a central hole 141 aligned with the circular rib 142 surrounding the central opening of the socket member adapted to receive the base post of a flashcube. The cylindrical inner surface 143 of the cap member is loosely engaged by the four peripheral surfaces 134 of the collar portion of the socket member to retain those two members in concentric relation to one another. The outer cylindrical surface 144 of the cap member is similarly engaged by an annular lip 145 at the top of recessed cylindrical opening 146 in the top wall 147 of the camera. Annular lip 148, at the lower end of the cap member, is also received in recessed opening 146 below shoulder 149, which limits upward movement of the cap member to the position shown in FIG. 13.

Four slots 151 in the cap member are adapted to accommodate the upwardly projecting tongue 138 of the respective firing levers so that those tongues can extend through the corresponding slots in the base member of a flashcube. Similarly, four vertical slots 152 in the cylindrical portion of the cap member receive fingers 153 of the corresponding firing levers and thereby prevent relative rotation between the socket member and the cap member. Relatively weak coil springs 154 are provided in corresponding vertical holes in the socket member to urge the cap member upwardly relative to the socket member; which is precluded from vertical movement by screw 155 threaded into its lower support shank 156 extending downwardly from socket pinion 157 through lower support bushing 158.

Whenever the socket is empty, the cap member is maintained at its upper position by springs 154. In that position, the lower ends of vertical slots 152 are engaged with the fingers 153 of the corresponding firing levers and thereby locate the tongues of the levers in their respective lowered positions shown in FIGS. 13 and 15. When a flashcube is installed in the socket, however, its base member presses the cap member downwardly against the socket member. This moves the lower ends of slots 152 out of engagement with firing lever fingers 153 so that each firing lever will then assume either its raised or lowered position depending on whether it encounters a cocked firing wire within the flashcube.

Adjacent the socket member, a blocking dog 159 is pivotally supported by a stud 161 and is biased into contact with a stop pin 162 by a weak hairpin spring 163. A blocking pin 164 is provided on each firing lever and is horizontally aligned with the shoulder 165 of the blocking dog when that lever is in its lowered position; i.e., when the corresponding bulb is in usable condition. As the flashcube is rotated initially in a counterclockwise direction by the same type of film-winding mechanism described previously, the blocking pins will miss the blocking dog if the corresponding firing levers are raised and will bypass the dog by camming it downwardly against the resistance of spring 163 if the corresponding firing levers are lowered. During the subsequent reverse rotation of the flashcube, a raised blocking pin will likewise pass above the blocking dog but the first lowered blocking pin to encounter the dog will be blocked by shoulder 165, thereby arresting further rotation of the socket member with the corresponding bulb located at the firing position.

The bulb ignition and shutter-operating mechanism associated with this embodiment is likewise substantially identical to the one described earlier, comprising a striker hammer 166, which is located below the lower tongue 167 of the firing lever associated with the forwardly facing flashbulb and adapted to drive that lever upwardly to effect bulb ignition. Since such upward movement of that lever disengages its blocking pin 164 from shoulder 165 of the blocking dog, the socket member is provided with radial pins 168 engageable with ear 105 of the latch bar to prevent rotation of the flashcube during bulb ignition in the same manner previously described.

The signal system incorporated in this embodiment of the invention comprises a bent signal rod 169 pivotally supported by a bracket 171 and resiliently biased by a weak hairpin spring 172 to maintain signal vane 173 above the field of the camera viewfinder. At its opposite end, the rod is provided with a cam segment 174 which is positioned directly above finger 175 extending outwardly from firing lever 135d when the corresponding bulb is in firing position. Consequently, if that bulb has been fired, the firing lever assumes its raised position and finger 175 lifts the cam segment of rod 169 as shown in broken lines in FIG. 15, thereby moving the signal vane downwardly into view. Since a usable bulb will always be present at the firing position unless all four bulbs have been fired, it will be apparent that finger 175 is provided only on firing lever 135d in order that the signal vane will not be visible unless all of the flashcube bulbs are inoperative. Also, it should be noted that the signal vane remains out of view whenever the flashcube socket is empty due to the fact that cap member 139 then retains all four firing levers in their respective lowered positions.

While the foregoing description of illustrative embodiments of the invention relates to use of so-called flashcubes, it should be recognized that the invention is also applicable to other types of multiple bulb flash units. Likewise, the invention is not necessarily limited to percussively ignited flash units but could be adapted to other types of bulb ignition systems. For example, the previously mentioned electrical means for sensing the condition of electrically fired flashcube bulbs could be combined with appropriate solenoid means adapted to control the indexing movement of the flashcube socket member, thereby achieving the same functional mode of operation provided by mechanical means in the illustrative embodiments of the invention.

The invention has been described in detail with particular reference to illustrative preferred embodiments thereof, but it will be understood that variations and modifications can be effected within the spirit and scope of the invention as described hereinabove and as defined in the appended claims.

I claim:

1. Apparatus for use with a flash unit, said flash unit having a plurality of lamps each lamp having an individual striking element movable from a preenergizable position to a striking position for firing said lamp, said apparatus comprising:
   means for receiving said flash unit, and
   means for sensing whether or not said unit contains at least one lamp having a striker in its preenergized position.

2. The apparatus according to claim 1, further including means responsive to said sensing means for indicating whether or not said unit contains at least one lamp having a striker in its preenergized position.

3. Apparatus for use with a flash unit, said flash unit having a plurality of lamps each lamp having an individual striking element movable from a preenergizable position to a striking position for firing said lamp, said apparatus comprising:
   means for receiving said flash unit,
   means for sensing whether or not said unit contains at least one lamp having a striker in its preenergized position, and
   means controlled by said sensing means and responsive to said sensing of at least one lamp having a striker in its preenergized position, for positioning one such lamp at a predetermined site.

4. Apparatus for use with a flash unit, said flash unit having a plurality of lamps each lamp having an individual striking element movable from a preenergized position to a striking position for firing said lamp, said apparatus comprising:
   a rotatable socket for releasably retaining said flash unit,
   means for rotating said socket to bring said lamps sequentially to a sensing position,
   means for sensing presence or absence of a striker in its preenergized position in each lamp at said sensing position, and
   means for stopping rotation of said socket in response to sensing the presence of a striker in the preenergized position.

5. The apparatus according to claim 4 wherein:
   said sensing means comprises an elongated finger and said apparatus includes means urging said finger toward a retained flash unit,
   said socket includes a cam means rotatable with said socket for controlling the position of said finger as said socket is rotated to repetitively place said finger into position to sense a striker in said preenergized position for each lamp as said lamp is rotated to said sensing position, and
   said stopping means includes:
      first means responsive to movement of said sensing means to take a first position if said sensing means senses a striker and a second position if said sensing means senses the absence of a striker, and
      second means coupled to said socket and positioned to engage said first means when said first means is in said first position for stopping said socket.

6. The apparatus according to claim 4 further including:
   a plurality of pins rotatable with said socket, one for each striker in said retained unit, each of said pins being positionable in one of first and second positions when a flash unit is received by said retaining means according to presence or absence respectively of its respective striker in said strikers preenergized position, and
   said sensing means includes means for sensing whether or not the pin for the lamp passing said sensing position is in said first or said second position.

7. Apparatus for use with a flash unit, said flash unit having a plurality of lamps each lamp having an individual striking element movable from a preenergized position to a striking position for firing said lamp, said apparatus comprising:
   a rotatable socket for receiving said flash unit,
   spring means energizable to urge rotation of said socket in a first direction,
   means for releasably rotating said socket in a second direction opposite to said first direction to energize said spring to provide sufficient energy when released to rotate said socket through an angle bringing each of said lamps past a single sensing position,
   means for sensing the presence or absence of a striker in its preenergized position in each lamp at said sensing position, and
   means for stopping rotation of said socket in said first direction in response to sensing the presence of a striker in its preenergized position.

8. A camera for use with a flash unit, said flash unit having a plurality of lamps each lamp having an individual striking element movable from a preenergizable position to a striking position for firing said lamp, said camera comprising:
  means for receiving and retaining said unit,
  means for advancing film in said camera,
  spring means energizable to urge rotation of said receiving means in a first direction,
  means for rotating said receiving means in response to actuation of said film advance means in a second direction opposite to said first direction to energize said spring sufficiently to provide sufficient energy when released to rotate said receiving means through an angle bringing each of said lamps past a single sensing position and for releasing said receiving means allowing said receiving means to rotate in response to the force provided by said spring means,
  means for sensing presence or absence of a striker in its preenergized position in each lamp at its sensing position, and
  means for stopping rotation of said receiving means in response to sensing the presence of a striker in its preenergized position.

9. Apparatus for use with a flash unit, said flash unit having a plurality of lamps each lamp having an individual striking element movable from a preenergized position to a striking position for firing said lamp, said apparatus comprising:
  a socket for receiving said flash unit,
  means for rotating said socket through an angle sufficient to bring each of said lamps past a single sensing position,
  means for sensing presence or absence of a striker in its preenergized position in each lamp at said sensing position,
  means for stopping rotation of said socket in response to sensing the presence of a striker in its preenergized position, and
  means responsive to rotation of said socket completely through said angle for indicating that said unit contains no lamps having a striker in its preenergized position.

* * * * *